US012586824B2

(12) United States Patent
Roeschenthaler et al.

(10) Patent No.: US 12,586,824 B2
(45) Date of Patent: Mar. 24, 2026

(54) IMIDAZOLIDINYLIDE COMPOUND FOR USE AS A SHUT-DOWN ADDITIVE FOR LITHIUM ION BATTERIES AND ELECTROLYTE AND BATTERY

(71) Applicants: JACOBS UNIVERSITY BREMEN GGMBH, Bremen (DE); FORSCHUNGSZENTRUM JUELICH GMBH, Juelich (DE)

(72) Inventors: Gerd-Volker Roeschenthaler, Bremen (DE); Isidora Cekic-Laskovic, Muenster (DE); Natascha Von Aspern, Braunschweig (DE); Martin Winter, Muenster (DE); Mykhailo Shevchuk, Bremen (DE)

(73) Assignees: JACOBS UNIVERSITY BREMEN GGMBH, Bremen (DE); FORSCHUNGSZENTRUM JUELICH GMBH, Juelich (DE)

( * ) Notice: Subject to any disclaimer, the term of this patent is extended or adjusted under 35 U.S.C. 154(b) by 765 days.

(21) Appl. No.: 17/798,084

(22) PCT Filed: Feb. 9, 2021

(86) PCT No.: PCT/DE2021/200011
§ 371 (c)(1),
(2) Date: Aug. 8, 2022

(87) PCT Pub. No.: WO2021/160226
PCT Pub. Date: Aug. 19, 2021

(65) Prior Publication Data
US 2023/0099524 A1 Mar. 30, 2023

(30) Foreign Application Priority Data
Feb. 10, 2020 (DE) ..................... 10 2020 103 326.5

(51) Int. Cl.
*H01M 10/42* (2006.01)
*C07F 5/02* (2006.01)
(Continued)

(52) U.S. Cl.
CPC ......... *H01M 10/4235* (2013.01); *C07F 5/027* (2013.01); *H01M 10/0525* (2013.01); *H01M 10/0567* (2013.01); *H01M 2300/0025* (2013.01)

(58) Field of Classification Search
CPC ......... H01M 10/4235; H01M 10/0525; H01M 10/0567; H01M 2300/0025; C07F 5/027; Y02E 60/10; C07D 233/02
See application file for complete search history.

(56) References Cited

U.S. PATENT DOCUMENTS

2021/0292442 A1 9/2021 Liu et al.

FOREIGN PATENT DOCUMENTS

DE 11 2013 001 653 A5 12/2014
EP 2 828 272 A1 1/2015
(Continued)

OTHER PUBLICATIONS

Pia Janssen, Benjamin Streipert, Roman Krafft, Patrick Murmann, Shutdown potential adjustment of modified carbene adducts as additives for lithium ion battery electrolytes, Journal of Power Sources, vol. 367, p. 72-79 (Year: 2017).*
(Continued)

*Primary Examiner* — Nicholas A Smith
*Assistant Examiner* — Seamus Patrick McNulty
(74) *Attorney, Agent, or Firm* — Norman B. Thot

(57) ABSTRACT

An imidazolidinylide compound for use as a shut-down additive for a lithium-ion battery. The imidazolidinylide compound has a formula (I),
(Continued)

(I)

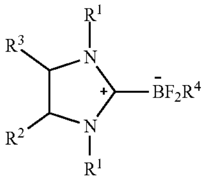

wherein, $R^1$ to $R^4$, each independently the other, is a linear $C_1$- to $C_{16}$-alkyl group, a branched $C_1$- to $C_{16}$-alkyl group, a $C_2$- to $C_{16}$-alkenyl group, a $C_3$- to $C_8$-cycloalkyl group, or a $C_3$- to $C_{16}$-arene group, wherein at least one of $R^2$ and $R^3$ may also be H, $R^1$ to $R^4$, each independently of the other, is completely, partially or not fluorinated, and $R^1$ to $R^3$ may each also contain O as a heteroatom.

10 Claims, 1 Drawing Sheet

(51) Int. Cl.
*H01M 10/0525* (2010.01)
*H01M 10/0567* (2010.01)

(56) References Cited

FOREIGN PATENT DOCUMENTS

| | | | |
|---|---|---|---|
| EP | 2 828 272 | B1 | 10/2016 |
| WO | WO 2013/139332 | A1 | 9/2013 |
| WO | WO 2020/020630 | A2 | 1/2020 |

OTHER PUBLICATIONS

P. Janssen et al.: "Shutdown potential adjustment of modified carbene adducts as additives for lithium ion battery electrolytes", Journal of Power Sources, vol. 367, pp. 72-79 (2017).
T. Böttcher et al.: "NHC->SiCL: An Ambivalent Carbene-Transfer Reagent", Chemistry A European Journal, vol. 21, pp. 893-899 (2015).
T. Böttcher et al.: "Carbene complexes of phosphorus(v) fluorides substituted with perfluoroalkyl-groups synthesized by oxidative addition. Cleavage of the complexes reveals a new synthetic protocol for ionic liquids", Dalton Transactions, vol. 43, pp. 2979-2987 (2014).
S. Nerkar et al.: "Synthesis and Suzuki Reactions of N-Heterocyclic Carbene Difluoro(aryl)-boranes", Organic Letters, vol. 17, pp. 3394-3397 (2015).
J. C. Walton et al.: EPR Studies of the Generation, Structure, and Reactivity of N-Heterocyclic Carbene Borane Radicals, Journal of the American Chemical Society, vol. 132, pp. 2350-2358 (2010).
M. Yoshio et al.: "Lithium-Ion Batteries", Science and Technologies, p. 91 (2009).
K. Xu: "Electrolytes and Interphases in Li-Ion Batteries and Beyond", Chemical Reviews, vol. 114, pp. 11503-11618 (2014).
K. Xu: "Nonaqueous Liquid Electrolytes for Lithium-Based Rechargeable Batteries", Chemical Review, vol. 104, pp. 4303-4417 (2004).
M. Q. Xu et al.: "Application of cyclohexyl benzene as electrolyte additive for overcharge protection of lithium ion battery", Journal of Power Sources, vol. 184, pp. 427-431 (2008).
S. Tobishima et al.: "Influence of electrolyte additives on safety and cycle life of rechargeable lithium cells", Journal of Applied Electrochemistry, vol. 33, pp. 143-150 (2003).
J. Menzel et al.: "Quantification of ionic organo(fluoro)phosphates in decomposed lithium battery electrolytes", Royal Society of Chemistry, vol. 7, pp. 39314-39324 (2017).
F. Larsson et al.: "Toxic fluoride gas emissions from lithium-ion battery fires", Scientific Reports, vol. 7, No. 10018, pp. 1-13 (2017).
O. Farooq: "A convenient high-yield preparation of phenylfluoroboranes", Journal of Fluorine Chemistry, vol. 70, pp. 225-227 (1995).
H.-J. Frohn et al.: A Convenient and General Approach to Alkyl-, Alk-1-enyl-, and Aryldifluoroboranes, Z. Anorg. Allg. Chem., vol. 628, pp. 723-724 (2002).
T. Böttcher et al.: "(NHC$^{Me}$)$SiCl_4$: a versatile carbene transfer reagont—synthesis from silicochloroform+", Chemical Science, vol. 4, pp. 77-83 (2013).
T. D. Parsons et al.: "Trifluoromethyl-Substitutes Boranes. Trifluoromethyldi-n-butylborane and Trifluoromethylboron Difluoride", Journal of the American Chemical Society, vol. 89, pp. 3446-3448 (1967).
W. Haubold et al.: "Darstellung und schwingungsspektroskopische Untersuchungen von Alkyl- und Arylborhalogeniden", Z. anorg. Allg. Chem., vol. 420, pp. 251-260 (1976) (English Abstract).
W. Haubold et al.: Reaktionen von Bortrihalogeniden mit Tris-(trimethylsilyl)-amin, Z. anorg. allg. Chem., vol. 421, pp. 105-110 (1976) (English Abstract).

* cited by examiner

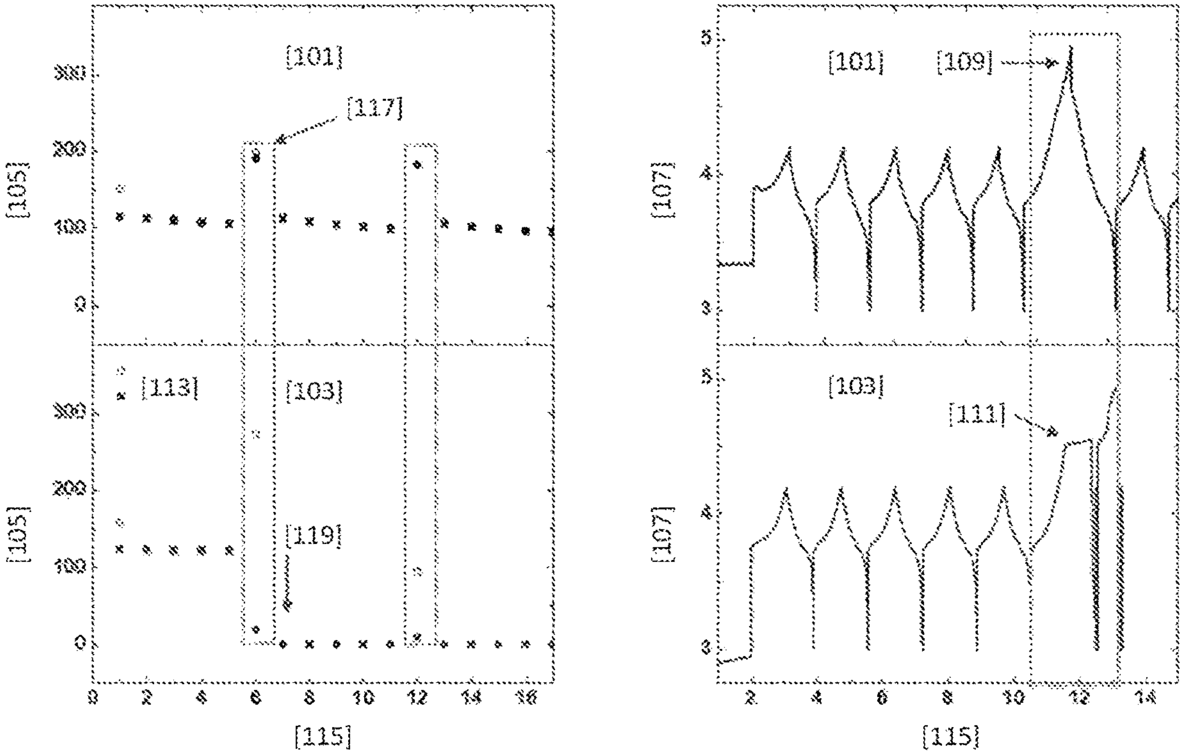
[101]
[117]
[105]
[113]
[103]
[119]
[105]
[115]
[101]
[109]
[107]
[103]
[111]
[107]
[115]

IMIDAZOLIDINYLIDE COMPOUND FOR USE AS A SHUT-DOWN ADDITIVE FOR LITHIUM ION BATTERIES AND ELECTROLYTE AND BATTERY

CROSS REFERENCE TO PRIOR APPLICATIONS

This application is a U.S. National Phase application under 35 U.S.C. § 371 of International Application No. PCT/DE2021/200011, filed on Feb. 9, 2021 and which claims benefit to German Patent Application No. 10 2020 103 326.5, filed on Feb. 10, 2020. The International Application was published in German on Aug. 19, 2021 as WO 2021/160226 A1 under PCT Article 21(2).

FIELD

The present invention relates to an imidazolidinylide compound for use as a shut-down additive for lithium-ion batteries, as well as to an electrolyte and a battery.

BACKGROUND

In order to achieve the efficient use of renewable energies and for use in electromobility, the importance of batteries as an energy source and storage medium has increased considerably in recent years. In order to be able to achieve these aims, the batteries used at present must be improved further.

In all types of present and future lithium, lithium-ion and dual-ion batteries, the electrolyte, owing to its interaction with all the other active and inactive materials that are used, has a central key function in terms of performance, service life and safety. The liquid electrolyte in particular has a significant impact on many chemical and technological aspects of a battery. The spectrum ranges from the conductivity (owing to the dissolving power of the conducting salts) through the electrochemical and thermal stability, the flammability and wettability to the forming of the solid electrolyte interphase (SEI) at the anode and the cathode electrolyte interphase (CEI) at the cathode. The liquid electrolyte, as the core component of every battery cell, consists of a conducting salt ($LiPF_6$) and a mixture of selected linear and cyclic organic carbonates, also referred to as standard electrolyte.

A disadvantage of this electrolyte is that it has no intrinsic chemical overcharge protection. A thermal runaway of the cell can therefore occur on overcharging (M. Yoshio, R. J. Brodd, A. Kozawa, Lithium-Ion Batteries: Science and Technologies, ISBN 978-0-387-34444-7. Springer-Verlag New York, 2009, p. 91).

By adding overcharge protection additives to the standard electrolyte, the charging process can be stopped at a specific potential and a thermal runaway of the battery can thus be prevented. Two different types of overcharge protection additives are known in the literature. The so-called "redox shuttle" additives are oxidized at the cathode and the resulting product then migrates to the anode, where it is reduced. The problem of these additives is that their chemical stability is too low (K. Xu, Chem. Rev. 2014, 114, 11503-11618; K. Xu, Chem. Rev. 2004, 104, 4303-4417). The so-called "shut-down" additives decompose at the electrode and thereby shut the cell down before a thermal runaway of the cell occurs. The problem with these compounds is that they have a negative impact on the cycling of the cell (M. Q. Xu, J. Power Sources, 2008. 184, 427-431; S. Tobishima, Y. Ogino, Y. Watanabe, J. Appl. Electrochem., 2003. 33, 143-150).

The compounds 1,3-dimethylimidazolidin-2-m-pentafluorophosphate (NHC-PFs), 1,3-dimethylimidazolidin-2-m-trifluoroborate (NHC-$BF_3$), and 1,3-dimethylimidazolidin-2-m-tetrafluorortrifluoromethylphosphate (NHC-$PF_4CF_3$) were described in P. Janssen et al., "Shutdown potential adjustment of modified carbene adducts as additives for lithium ion battery electrolytes", Journal of Power Sources, Vol. 367, 2017, p. 72-79, ISSN 0378-7753. However, NHC-$PF_5$ and NHC-$PF_4CF_3$ contain a phosphate group, which can be converted into toxic substances such as $PF_5$ in the event of damage and thermal loading of the battery, such as, for example, in the case of a car accident. NHC-$BF_3$ does not have this problem but, because of a decomposition voltage of 4.5 V, is limited to use at correspondingly lower voltages.

SUMMARY

An aspect of the present invention is to improve on the prior art. An aspect of the present invention is in particular to provide a class of shut-down additives which have only a slight or substantially no impact on the cycling of the cell. An aspect of the present invention to provide shut-down additives which permit the use of a higher working voltage and the provision of cells with an increased service life and cells with a higher energy efficiency.

In an embodiment, the present invention provides an imidazolidinylide compound for use as a shut-down additive for a lithium-ion battery. The imidazolidinylide compound has a formula (I), (I)

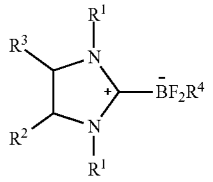

wherein, $R^1$ to $R^4$, each independently the other, is a linear $C_1$- to $C_{16}$-alkyl group, a branched $C_1$- to $C_{16}$-alkyl group, a $C_2$- to $C_{16}$-alkenyl group, a $C_3$- to $C_8$-cycloalkyl group, or a $C_3$- to $C_{16}$-arene group, wherein at least one of $R^2$ and $R^3$ may also be H, $R^1$ to $R^4$, each independently of the other, is completely, partially or not fluorinated, and $R^1$ to $R^3$ may each also contain O as a heteroatom.

BRIEF DESCRIPTION OF THE DRAWING

The present invention is described in greater detail below on the basis of embodiments and of the drawing in which:

The FIGURE shows four diagrams of cycling of NMC111||Li cells, which were carried out once with (in each case the bottom) and once without a shut-down additive, wherein a shut-down effect occurs in the cell with shut-down additive after overcharging and further overcharging is prevented.

DETAILED DESCRIPTION

The present invention provides an imidazolidinylide compound for use as a shut-down additive for lithium-ion batteries of formula (I)

(I)

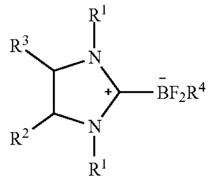

wherein $R^1$ to $R^4$ each independently of the others is a linear or branched $C_1$- to $C_{16}$-alkyl group or a $C_2$- to $C_{16}$-alkenyl group or a $C_3$- to $C_8$-cycloalkyl group or a $C_3$- to $C_{16}$-arene group, wherein $R^2$ and/or $R^3$ may also be H, wherein $R^1$ to $R^4$ each independently of the others is completely, partially or not fluorinated, wherein $R^1$ to $R^3$ may each also contain O as a heteroatom.

A shut-down effect of a battery can be achieved if a critical voltage is exceeded (overcharging) via the addition of the present imidazolidinylide compound. The cycling of the battery below that voltage is thereby substantially unaffected compared to a cell without a shut-down additive.

The compounds according to the present invention also permit the use of a higher working voltage and the provision of cells with an increased service life and a higher energy efficiency. By using the compounds according to the present invention, which permit a higher decomposition voltage during use, it is possible to operate cells at a higher working voltage while avoiding an unintentional shut-down of the cell. A higher capacity retention improves the service life of the cells with electrolytes according to the present invention, while a higher coulombic efficiency contributes towards higher energy efficiency during use.

The boron fluoride-based compounds known from the prior art were hitherto used only without substitution of the boron trifluoride, in particular NHC-$BF_3$. It has surprisingly been found that, despite the significant differences between phosphorus chemistry and boron chemistry, organically substituted boron difluoride-based compounds, in particular NHC-$BF_2$-R, are also suitable as shut-down additives and additionally permit the use of a higher working voltage.

By dispensing with phosphate groups in the shut-down additive, the development of toxic compounds, such as PFs, HF, $POF_3$, and in subsequent reactions also very toxic volatile organyl-fluorophosphates $ROP(O)F_2$ and organyl-fluorophosphonates $RP(O)F_2$, on release and decomposition of the shut-down additive is prevented. Instead, any boron compounds that are formed, such as $BF_4$— and boric acid, and $RBF_3$ or boronic acids, have lower toxicity and volatility (Menzel, J., Schultz, H., Kraft, V., Badillo, J. P., Winter, M., & Nowak, S. (2017), "Quantification of ionic organo(fluoro) phosphates in decomposed lithium battery electrolytes", RSC Advances, 7(62), 39314-39324. doi:10.1039/c7ra07486g; Larsson, F., Andersson, P., Blomqvist, P. et al., "Toxic fluoride gas emissions from lithium-ion battery fires", Sci Rep 7, 10018 (2017), https://doi.org/10.1038/s41598-017-09784-z).

A "shut-down" of the cell is here understood as in particular being a blocked ion transport and a reduced specific capacity. The shut-down effect in battery cells with an additive (the imidazolidinylide compound) is provided, for example, in that the additive decomposes at a defined potential and a passivation layer is formed on the cathode surface, whereby lithium-ion transport is blocked.

A "NMC111 cell" is understood as being a cell with a nickel-manganese-cobalt substance ratio of 1:1:1.

Via different variations of the substituents on the nitrogen-containing heterocyclic carbenes (NHCs), the shut-down potential can be influenced and customized to the appropriate application.

The different substituents have different effects on the shut-down potential. By the selective choice of the substituents, the shut-down additive can be adapted to the desired requirement. The shut-down voltage increases more if the fluorine content is higher.

Configuring the group $R^4$ as a fluorinated group, in particular $CF_3$ or $C_2F_5$, leads to a pronounced increase in the shut-down voltage. Configuring the group $R^1$ as a fluorinated group leads to a moderate increase in the shut-down voltage. Configuring the groups $R^2$ and $R^3$ as fluorinated groups leads in each case to only a slight increase in the shut-down voltage. By choosing a plurality of groups as fluorinated groups, for example, $R^4$ and $R^1$, the shut-down voltage can be increased further. The shut-down voltage is higher if the fluorine content of the compound overall is higher. A further possibility for increasing the shut-down voltage is to introduce aromatic groups, in particular to configure $R^4$ as a phenyl group.

The solubility of the imidazolidinylide compound can be increased by using heteroatoms in the groups $R^1$, $R^2$, $R^3$ or $R^4$. By using unsubstituted alkyl groups $R^1$, $R^2$, $R^3$ or $R^4$, the polarity of the imidazolidinylide compound can be reduced. By using aromatic groups in the groups $R^1$, $R^2$, $R^3$ or $R^4$, the stability of the imidazolidinylide compound can be increased.

$R^2$ can, for example, be the same as $R^3$.

In one embodiment, $R^1$ represents methyl, ethyl, n-propyl, i-propyl, n-butyl, i-butyl, $CH_2OMe$, $CH_2OCF_3$, $CH_2OC_2F_5$, $CH_2CF_3$, $CH_2C_2F_5$, $CH_2CH_2NMe_2$ or $CH{=}CH_2$.

In a further embodiment, $R^2$ and $R^3$ each independently of the other, represents H, methyl, n-propyl, i-propyl, n-butyl, i-butyl, $CF_3$ or $CH{=}CH_2$ or, with a ring formation, $CH_2CH_2CH_2CH_2$ or $CH_2OCH_2$.

$R^4$ can, for example, represent $CF_3$, $CH_3$, $C_2H_5$, $C_2F_5$, phenyl or $C_5F_6$.

In a further aspect, the present invention provides a method for the preparation of an imidazolidinylide compound, comprising the following steps:

preparing a halogen derivative of the imidazolidinylide compound, wherein the halogen derivative corresponds to the imidazolidinylide compound in which, in place of the fluorine atoms bonded to the boron atom, in each case a chlorine, bromine or iodine atom is present; and reacting the halogen derivative of the imidazolidinylide compound with hydrogen fluoride or a hydrogen fluoride-amine salt so that the imidazolidinylide compound is obtained.

The halogen derivative of the imidazolidinylide compound is prepared, for example, by reacting an organic boron dihalide $RBX_2$ with a tetrachlorosilane-carbene complex.

In a further embodiment, triethylamine-trihydrogenfluoride is used as the hydrogen fluoride-amine salt.

In a further embodiment, a chlorine atom is present in each case in place of the fluorine atoms bonded to the boron atom.

In a further aspect, the electrolyte contains an imidazolidinylide compound described above.

The present invention additionally relates to a battery which contains an electrolyte described above.

The following abbreviations are used: $LiPF_6$=lithium hexafluorophosphate. EC=ethylene carbonate. DEC=diethyl carbonate. XPS=X-ray photoelectron spectroscopy. AFM=atomic force microscopy. SEM=scanning electron microscopy.

Further advantages will become apparent from the accompanying drawing and the following examples.

In the FIGURE, the cycle number 115 is indicated on the abscissa in each of the four graphs. In the top left graph 101, which shows a measurement on the cell without additive 101, and in the bottom left graph 103, which shows a measurement on the cell with additive 103, the ordinate in each case indicates the specific capacity in milliamperes per gram 105.

In the top left graph 101 and in the bottom left graph 103, an empty box symbol represents the specific capacity which is applied on charging, and a filled box symbol represents the specific capacity which is achieved on discharging.

In the top left graph without additive 101 and in the bottom left graph with additive 103, very similar specific capacities of about 125 milliamperes per gram are achieved on discharging in each case. Without overcharging, the shut-down additive thus has substantially no impact on the cycling. From the sixth cycle, the top left graph without additive 101 and the bottom left graph with additive 103 differ significantly: in the top left graph 101, after a cycle with charging and discharging with a specific capacity of about 200 milliamperes per gram ("overcharging"), a specific capacity of about 125 milliamperes per gram is likewise achieved in the following 6th to 11th cycles on discharging. In the bottom left graph 103, on the other hand, a fall in the specific capacity close to 0 milliamperes per gram is observed on discharging following overcharging; this is referred to as the shut-down effect. The same behavior is also to be observed in each case in the 12th cycle after a second overcharging.

In the top right graph 101, which shows a measurement on the cell without additive 101, and in the bottom right graph 103, which shows a measurement on the cell with additive 103, the ordinate in each case indicates the potential in volts against a Li|$Li^+$ half-cell 107.

In the top right graph 101, the potential 107 fluctuates on charging and discharging between about 3 volts and about 4.25 volts up to the 10th cycle. This is likewise to be observed in the bottom right graph 103, that is to say the shut-down additive has no impact on the potential 107 before overcharging. From the 11th cycle, overcharging is to be observed in the top right graph 101 and in the bottom right graph 103; the potential 107 approaches about 5 volts in the top right graph 101. In the bottom right graph 103, the potential 107 approaches only about 4.5 volts, until decomposition of the shut-down additive 111 is observed and the potential 107 initially increases only slightly. In the further cycling, a similar potential profile as before the overcharging between about 3 volts and about 4.25 volts is again to be observed in the top right graph 101. In the right left graph 103, on the other hand, a potential profile between 3 volts and about 5 volts is to be observed, this is associated with the shut-down effect.

EXAMPLES

Preparation Example Shut-Down Additive 1

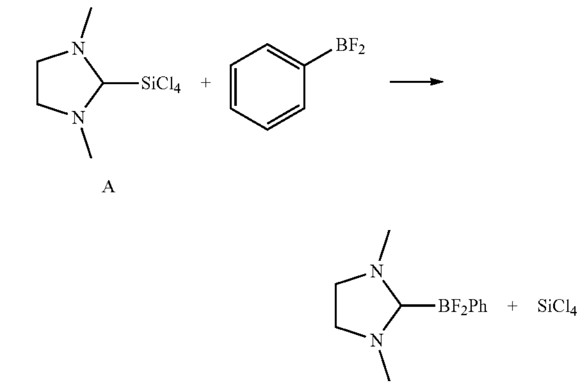

A

1

| | | | |
|---|---|---|---|
| 268.03 g/mol | 125.91 g/mol | 224.06 g/mol | 169.89 g/mol |
| 2.68 g | 1.26 g | 2.24 g | 1.70 g |
| 10 mmol | 10 mmol | 10 mmol | 10 mmol |

20 ml of solvent $CH_2Cl_2$; yield 85% white solid.

The two components were stirred under an inert gas atmosphere at 0° C. The reaction mixture was brought to room temperature and stirred for a further 12 hours. All the volatile components were removed under reduced pressure and the crude product was dissolved in a minimal amount of hot toluene and recrystallized.

The identity of the compound was confirmed by NMR spectroscopy, IR spectroscopy, and mass spectrometry.

Preparation of Ph-$BF_2$: O. Farooq, J. Fluorine Chem. 1995, 70, 225-227; H.-J. Frohn, F. Bailly, V. V. Bardin, Z. Anorg. Allg. Chem. 2002, 628, 723-724.

The preparation of compound A is described in the literature ("NHCMe]$SiCl_4$: A Versatile Carbene Transfer Reagent—Synthesis From Silicochloroform", T. Böttcher, B. S. Bassil, L. Zhechkov, T. Heine, G.-V. Röschenthaler, Chem. Sci., 2013, 4, 77-83; "Tetrachlorosilane complexes with diaminocarbene and imidazolylidene ligands as carbene transfer reagents", T. Böttcher, B. S. Bassil, G.-V. Röschenthaler (Jacobs University Bremen); DE 112013001653 A5; EP 2828272 A1; EP 2828272 B1; WO 2013/139332 A1).

In an alternative synthesis, a boron chloride derivative was first prepared and was reacted in a second reaction step using triethylamine-trihydrogen fluoride ($Et_3N.3HF$) to form the fluorine derivative.

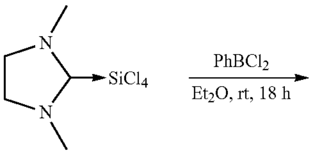

-continued

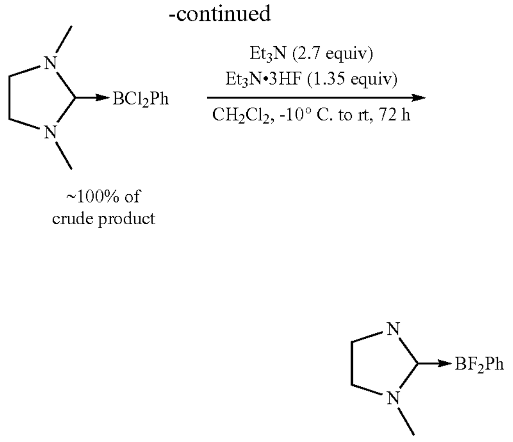

In detail, the following reaction for the preparation of (1,3-dimethyl-2-imidazolidinylidene)-difluorophenylboron was carried out: dichlorophenylboron (4.8 ml, 36 mmol) was added to a stirred suspension of (1,3-dimethyl-2-imidazolidinylidene)tetrachlorosilane (9.40 g, 35 mmol) in 200 ml of freshly distilled diethyl ether, and the resulting mixture was stirred for 18 hours at room temperature. Volatile constituents were removed in vacuo, and the solid that remained was taken up in 100 ml of a 1:1 diethyl ether/pentane mixture, filtered off, washed with 50 ml of the 1:1 diethyl ether/pentane mixture, and dried for 40 minutes in vacuo. Crude yield of (1,3-dimethyl-2-imidazolidinylidene) dichlorophenylboron 9.01 g (100%). $^{1}H$ NMR (400 MHz, $CDCl_3$, $(CH_3)_4Si$): δ 7.66 (d, 6.6 Hz, 2H), 7.29 (t, 6.6 Hz, 2H), 7.20 (t, 6.6 Hz, 1H), 3.66 (s, 4H), 3.02 (s, 6H); $^{1}1B$ NMR (128 MHz, $CDCl_3$, $BF_3$, $Et_2O$): δ 0.1 (s). The crude product was sufficiently pure (~90 mol %) for the next step. The crude product (1,3-dimethyl-2-imidazolidinylidene)dichlorophenylboron (8.09 g) was dissolved in 80 ml of dry dichloromethane. The resulting solution was cooled to −10° C., and a solution of triethylamine (12.1 ml, 87 mmol) and triethylamine-trihydrogenfluoride (6.8 ml, 42 mmol) in 20 ml of dry dichloromethane was added slowly. The reaction mixture was brought to room temperature and then stirred for 72 hours at room temperature. The reaction was stopped by the addition of 25 ml of water, and the aqueous phase was separated off and extracted with dichloromethane (3×10 ml). The extracts were combined with the dichloromethane main fraction, and the combined organic phase was washed with a saturated aqueous solution of sodium bicarbonate (2×25 ml) and salt solution (35 ml). After drying the solution over magnesium sulfate, the solvent was removed in vacuo to yield 6.78 g of a pale-yellow wax-like residue. Purification of the residue by means of column chromatography on silicon dioxide (ethyl acetate/hexane 2:1 as eluant) yielded 3.89 g (melting point 105° C.) of the target compound in the form of colorless crystals. $^{1}H$ NMR (400 MHz, $CDCl_3$, TMS): δ 7.49 (d, 6.6 Hz, 2H), 7.31-7.21 (m, 3H), 3.60 (s, 4H), 3.27 (s, 6H); $^{13}C$ NMR (100 MHz, $CDCl_3$, TMS): δ 183.0, 147.1, 131.0, 127.6, 127.0, 51.2, 35.1; $^{19}F$ NMR (376 MHz, $CDCl_3$, $CFCl_3$): δ −158.5 (m); $^{11}B$ NMR (128 MHz, $CDCl_3$, $BF_3.Et_2O$): δ 3.2 (t, 64.0 Hz).

Preparation Example Shut-Down Additive 2

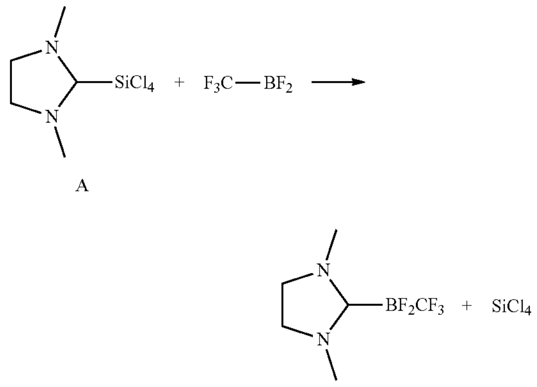

2

| | | | |
|---|---|---|---|
| 268.03 g/mol | 117.81 g/mol | 215.96 g/mol | 169.89 g/mol |
| 2.68 g | 1.18 g | 2.16 g | 1.70 g |
| 10 mmol | 10 mmol | 10 mmol | 10 mmol |

20 ml of solvent $CH_2Cl_2$; yield 70%, white solid.

Shut-down additive 2 was prepared analogously to shut-down additive 1.

The identity of the compound was confirmed by NMR spectroscopy, IR spectroscopy and mass spectrometry.

Preparation of $CF_3BF_2$: T. D. Parsons, J. M. Self, L. H. Schaad, J. Am. Chem. Soc. 1967, 89, 3446-3448.

Preparation Example Shut-Down Additive 3

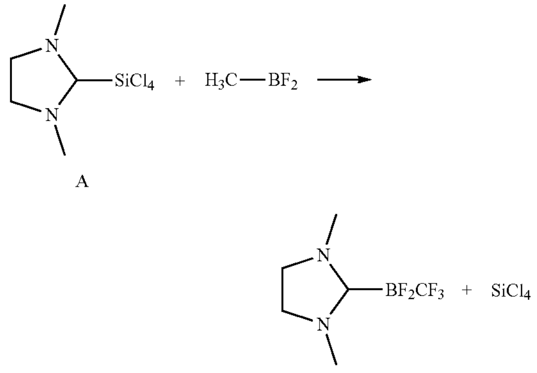

3

| | | | |
|---|---|---|---|
| 268.03 g/mol | 63.84 g/mol | 161.99 g/mol | 169.89 g/mol |
| 2.68 g | 0.64 g | 1.62 g | 1.70 g |
| 10 mmol | 10 mmol | 10 mmol | 10 mmol |

20 ml of solvent $CH_2Cl_2$; yield 65%, white solid.

Shut-down additive 3 was prepared analogously to shut-down additive 1.

The identity of the compound was confirmed by NMR spectroscopy, IR spectroscopy and mass spectrometry.

Preparation Example Shut-Down Additive 4

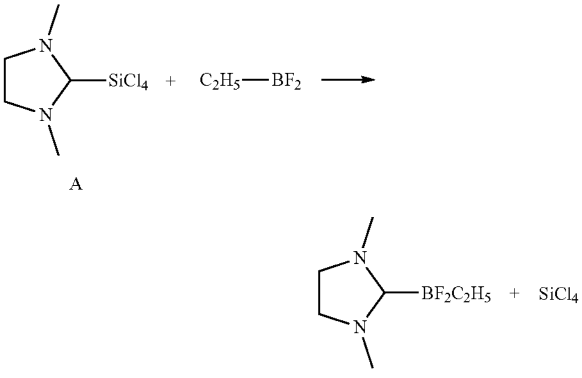

A

4

| | | | |
|---|---|---|---|
| 268.03 | 77.87 | 176.02 | 169.89 |
| g/m | g/mol | g/mol | g/mol |
| 2.68 g | 0.78 g | 1.76 g | 1.70 g |
| 10 mmol | 10 mmol | 10 mmol | 10 mmol |

20 ml of solvent $CH_2Cl_2$; yield 70%, white solid.

Shut-down additive 4 was prepared analogously to shut-down additive 1.

The identity of the compound was confirmed by NMR spectroscopy, IR spectroscopy and mass spectrometry.

Preparation of $CH_3BF_2$ or $C_2H_5BF_2$: W. Haubold, J. Weidlein, Z. Anorg. Allg. Chem. 1976, 420, 251-260.

EXAMPLES

In order to study the behavior of the electrolyte according to the present invention for high-voltage applications, an electrolyte with 1M $LiPF_6$ in ethylene carbonate (EC) and diethyl carbonate (DEC) (1:1) was tested in graphite/NCM111 cells in the indicated potential range either without the addition of the shut-down additive or with a given amount of the shut-down additive (wt. %). A microporous ceramics-coated film (obtainable under the trade name Separion® from Evonik Industries AG) was used as a separator. The cells were formed with a C-rate of 0.1C and cycled galvanostatically with a subsequent C-rate of 1 C at 20° C. The C-rate describes the charge (or discharge) current of a battery, based on the capacity C.

In order to demonstrate the effectiveness of shut-down additive 1, overcharging at 3.0-4.95 V vs. Li/Li+ was carried out at each 5th cycle, in one case without the addition of shut-down additive 1, and in the other case with the addition of 1% shut-down additive 1 (wt. %).

In the cell without additive, it was observed that overcharging is not prevented when a high voltage is applied. After overcharging, the cell is in a state which is problematic for reasons of safety because it can lead to a thermal runaway.

In the cell with additive, it was observed that the additive decomposes after overcharging, forms a passivation layer on the cathode surface and thus blocks lithium-ion transport. So-called shut-down of the cell thus occurs, i.e., no further specific capacity is present.

An analysis of the shut-down effect was carried out by means of galvanostatic cycling, and also by means of impedance spectroscopy (pronounced increase in the charge transfer resistance is observed), by means of XPS (decomposition products of the additive were identified and the thickness of the passivation layer was determined). The shut-down effect was additionally visualized by means of the imaging methods AFM and SEM.

Further tests were carried out with the addition of 2% shut-down additive 1 (wt. %) and with the addition of 3% shut-down additive 1 (wt. %). These tests showed analogous results (a shut-down effect of a battery with only slight or substantially no impact on the cycling of the cell).

The following shut-down additives were furthermore compared:

Example 1

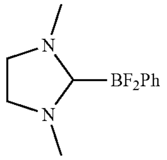

NHC—$BF_2$—Ph

Example 2

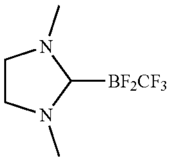

2

NHC—$BF_2$—$CH_3$

STdT 1

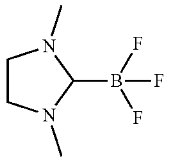

NHC—$BF_3$

STdT 2

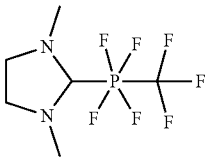

NHC—$PF_4$—$CF_3$

Table 1 shows the decomposition voltage, the capacity retention, and the coulombic efficiency of the compounds according to the present invention (NHC-$BF_2$-Ph and NHC-$BF_2$-$CH_3$) and of the compounds from the prior art (NHC-$BF_3$ and NHC-$PF_4$-$CF_3$), in each case when used in an electrolyte under the conditions mentioned above. The shut-down additive was thereby used in a 0.1 M concentration in each case.

TABLE 1

Decomposition voltage, capacity retention and coulombic efficiency of the compounds according to the present invention and of the compounds from the prior art.

| Compound | Decomposition voltage [V vs. Li \| Li+] | Capacity retention 50th cycle [%] | Coulombic efficiency (CE) 5-50 cycles [%] |
|---|---|---|---|
| NHC-$BF_3$ | 4.5 | 103.7 | 99.5 |
| NHC-$PF_5$ | 4.6 | 89.1 | 98.7 |
| NHC-$BF_2$-Ph | 4.6 | 86.9 | 99.8 |
| NHC-$PF_4CF_3$ | 4.7 | 82.9 | 99.2 |

A cell with an electrolyte containing NHC-$BF_2$-Ph as shut-down additive exhibits a significantly better galvanostatic cycle behavior than an otherwise identical cell with a shut-down additive from the prior art (in each case NHC-$BF_3$ or NHC-$PF_4$-$CF_3$). The cycle behavior can be derived from the decomposition voltage, the capacity retention, and the coulombic efficiency.

Owing to the higher decomposition voltage when using NHC-$BF_2$-Ph, it is possible to operate cells with electrolytes according to the present invention at a higher working voltage, whereby an unintentional shut-down of the cell can nevertheless be avoided. A higher capacity retention improves the service life of the cells with electrolytes according to the present invention, while a higher coulombic efficiency permits a higher energy efficiency during use.

The present invention is not limited to embodiments described herein; reference should be had to the appended claims.

LIST OF REFERENCE NUMERALS

101 Cell without additive: 1M $LiPF_6$ EC:DEC (3:7, weight ratio)
103 Cell with additive: 1M $LiPF_6$ EC:DEC (3:7, weight ratio)+additive (1 wt. %)
105 Specific capacity [mA/g]
107 Potential [V] against Li|$Li^+$
109 Overcharging to 4.95 V against Li|$Li^+$
111 Decomposition of the additive
113 Empty box symbol: charging. Filled box symbol: discharging.
115 Cycle number
117 Overcharging
119 Shut-down effect

What is claimed is:

1. An imidazolidinylide compound for use as a shut-down additive for a lithium-ion battery, the imidazolidinylide compound having a formula (I), (I)

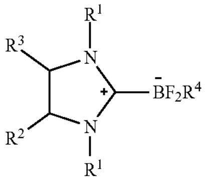

wherein, $R^1$ is a linear $C_1$- to $C_{16}$-alkyl group, a branched $C_1$- to $C_{16}$-alkyl group, a $C_2$- to $C_{16}$-alkenyl group, a $C_3$- to $C_8$-cycloalkyl group, or a $C_3$- to $C_{16}$-arene group, $R^2$ is H, a linear $C_1$- to $C_{16}$-alkyl group, a branched $C_1$- to $C_{16}$-alkyl group, a $C_2$- to $C_{16}$-alkenyl group, a $C_3$- to $C_8$-cycloalkyl group, or a $C_3$- to $C_{16}$-arene group, $R^3$ is H, a linear $C_1$- to $C_{16}$-alkyl group, a branched $C_1$- to $C_{16}$-alkyl group, a $C_2$- to $C_{16}$-alkenyl group, a $C_3$- to $C_8$-cycloalkyl group, or a $C_3$- to $C_{16}$-arene group, $R^4$ is a linear $C_1$- to $C_{16}$-alkyl group, a branched $C_1$- to $C_{16}$-alkyl group, a $C_2$- to $C_{16}$-alkenyl group, a $C_3$- to $C_8$-cycloalkyl group, or a $C_3$- to $C_{16}$-arene group, $R^1$ is completely, partially or not fluorinated, $R^2$ is completely, partially or not fluorinated, $R^3$ is completely, partially or not fluorinated, $R^4$ is partially or not fluorinated, $R^1$ may also contain O as a heteroatom, $R^2$ may also contain O as a heteroatom, and $R^3$ may also contain O as a heteroatom.

2. The imidazolidinylide compound as recited in claim 1, wherein $R^2$ is the same as $R^3$.

3. The imidazolidinylide compound as recited in claim 1, wherein $R^1$ is methyl, ethyl, n-propyl, i-propyl, n-butyl, i-butyl, $CH_2OMe$, $CH_2OCF_3$, $CH_2OC_2F_5$, $CH_2CF_3$, $CH_2C_2F_5$, $CH_2CH_2NMe_2$ or $CH{=}CH_2$.

4. The imidazolidinylide compound as recited in claim 1, wherein, $R^2$ is H, methyl, n-propyl, i-propyl, n-butyl, i-butyl, $CF_3$ or $CH{=}CH_2$ or, with a ring formation, $CH_2CH_2CH_2CH_2$ or $CH_2OCH_2$, and $R^3$ is H, methyl, n-propyl, i-propyl, n-butyl, i-butyl, $CF_3$ or $CH{=}CH_2$ or, with a ring formation, $CH_2CH_2CH_2CH_2$ or $CH_2OCH_2$.

5. The imidazolidinylide compound as recited in claim 1, wherein $R^4$ is $CH_3$, $C_2H_5$, or phenyl.

6. A method for preparing the imidazolidinylide compound as recited in claim 1, the method comprising:

preparing a halogen derivative of the imidazolidinylide compound, wherein the halogen derivative corresponds to the imidazolidinylide compound where, in place of the fluorine atom(s) bonded to the boron atom, in each case, a chlorine atom, a bromine atom or an iodine atom is present; and reacting the halogen derivative of the imidazolidinylide compound with hydrogen fluoride or with a hydrogen fluoride-amine salt so as to obtain the imidazolidinylide compound.

7. The method as recited in claim 6, wherein the hydrogen fluoride-amine salt is triethylamine-trihydrogenfluoride.

8. The method as recited in claim 6, wherein, in each case, the chlorine atom is present in place of the fluorine atom(s) bonded to the boron atom.

9. An electrolyte comprising the imidazolidinylide compound as recited in claim 1.

10. A battery comprising the electrolyte as recited in claim 9.

* * * * *